(12) United States Patent
Uchizono et al.

(10) Patent No.: US 12,473,441 B2
(45) Date of Patent: Nov. 18, 2025

(54) INK JET INK COMPOSITION AND RECORDING METHOD

(71) Applicant: Seiko Epson Corporation, Tokyo (JP)

(72) Inventors: Shunsuke Uchizono, Shiojiri (JP); Hiroaki Kumeta, Matsumoto (JP); Soichi Yamazaki, Shiojiri (JP); Manabu Taniguchi, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 858 days.

(21) Appl. No.: 17/700,596

(22) Filed: Mar. 22, 2022

(65) Prior Publication Data

US 2022/0315777 A1    Oct. 6, 2022

(30) Foreign Application Priority Data

Mar. 23, 2021 (JP) ................... 2021-048962

(51) Int. Cl.
| | |
|---|---|
| C09D 11/00 | (2014.01) |
| B41J 2/01 | (2006.01) |
| C08K 3/36 | (2006.01) |
| C08K 5/3415 | (2006.01) |
| C09D 11/033 | (2014.01) |
| C09D 11/037 | (2014.01) |

(52) U.S. Cl.
CPC ............ *C09D 11/037* (2013.01); *B41J 2/01* (2013.01); *C08K 3/36* (2013.01); *C08K 5/3415* (2013.01); *C09D 11/033* (2013.01); *C08K 2201/003* (2013.01)

(58) Field of Classification Search
CPC ........ C09D 11/037; C09D 11/033; B41J 2/01; C08K 3/36; C08K 2201/003

USPC ................ 106/31.01, 31.13, 31.6, 31.86
See application file for complete search history.

(56) References Cited

U.S. PATENT DOCUMENTS

| | | | |
|---|---|---|---|
| 4,451,388 | A | 5/1984 | Payne |
| 5,925,178 | A | 7/1999 | Martin et al. |
| 5,972,087 | A | 10/1999 | Uraki et al. |
| 6,039,796 | A | 3/2000 | Kubota et al. |
| 6,234,601 | B1 | 5/2001 | Hayashi et al. |
| 6,612,691 | B1 | 9/2003 | Koitabashi et al. |
| 8,460,450 | B2 | 6/2013 | Taverizatshy et al. |
| 8,740,368 | B2 | 6/2014 | Ikoshi et al. |

(Continued)

FOREIGN PATENT DOCUMENTS

| | | |
|---|---|---|
| CN | 102190929 A | 9/2011 |
| CN | 102675962 A | 9/2012 |

(Continued)

OTHER PUBLICATIONS https://www.chempoint.com/guides/ludox-grade-selector-guide (Year: 2020).*

(Continued)

*Primary Examiner* — James E Mcdonough
(74) *Attorney, Agent, or Firm* — Harness, Dickey & Pierce, P.L.C.

(57) ABSTRACT

An ink jet ink composition includes: a colorant; silica particles; 1-(2-hydroxyethyl)-2-pyrrolidone; and water, and the silica particles have in a TEM image thereof, a Di (diameter of the maximum inscribed circle)/Dc (diameter of the minimum circumscribed circle) of 0.7 or more.

10 Claims, 1 Drawing Sheet

(56) References Cited

U.S. PATENT DOCUMENTS

| | | | |
|---|---|---|---|
| 8,955,954 | B2 | 2/2015 | Yamazaki |
| 2007/0237911 | A1 | 10/2007 | Nakano |
| 2010/0003407 | A1 | 1/2010 | Ito |
| 2010/0190922 | A1 | 7/2010 | Shinozaki et al. |
| 2011/0069111 | A1 | 3/2011 | Matsumoto et al. |
| 2011/0069112 | A1 | 3/2011 | Matsumoto et al. |
| 2011/0227995 | A1 | 9/2011 | Ikoshi et al. |
| 2011/0242196 | A1 | 10/2011 | Okada et al. |
| 2011/0242213 | A1 | 10/2011 | Okada et al. |
| 2012/0162307 | A1 | 6/2012 | Yamazaki |
| 2012/0262516 | A1 | 10/2012 | Yamazaki et al. |
| 2013/0050355 | A1 | 2/2013 | Imamura et al. |
| 2013/0241991 | A1 | 9/2013 | Okada et al. |
| 2013/0281593 | A1 | 10/2013 | Yamazaki et al. |
| 2013/0286118 | A1 | 10/2013 | Okada et al. |
| 2014/0285572 | A1 | 9/2014 | Hanaoka et al. |
| 2015/0091973 | A1 | 4/2015 | Ikoshi et al. |
| 2015/0158293 | A1 | 6/2015 | Suzuki et al. |
| 2016/0176188 | A1 | 6/2016 | Mabuchi et al. |
| 2017/0096570 | A1* | 4/2017 | Litman ............... C09D 11/102 |
| 2017/0253754 | A1 | 9/2017 | Kawaharada et al. |
| 2018/0187031 | A1 | 7/2018 | Teramoto et al. |
| 2020/0009880 | A1 | 1/2020 | Yamazaki et al. |
| 2020/0009890 | A1 | 1/2020 | Yamazaki et al. |
| 2020/0339829 | A1 | 10/2020 | Kumeta et al. |
| 2020/0385593 | A1 | 12/2020 | Uchizono et al. |
| 2021/0062025 | A1 | 3/2021 | Harvey et al. |
| 2021/0292584 | A1 | 9/2021 | Rudisill et al. |
| 2021/0301155 | A1 | 9/2021 | Oki et al. |
| 2022/0348780 | A1 | 11/2022 | Rudisill et al. |

FOREIGN PATENT DOCUMENTS

| | | |
|---|---|---|
| CN | 111849247 A | 10/2020 |
| EP | 2444462 A1 | 4/2012 |
| JP | H05-331391 A | 12/1993 |
| JP | H09-157560 A | 6/1997 |
| JP | H09-272826 A | 10/1997 |
| JP | H09-286941 A | 11/1997 |
| JP | H10-060342 A | 3/1998 |
| JP | H11-001647 A | 1/1999 |
| JP | H11-012516 A | 1/1999 |
| JP | H11-256083 A | 9/1999 |
| JP | 2000-053901 A | 2/2000 |
| JP | 2003-105235 A | 4/2003 |
| JP | 2006-240298 A | 9/2006 |
| JP | 2006-321876 A | 11/2006 |
| JP | 2007-152769 A | 6/2007 |
| JP | 2008-031356 A | 2/2008 |
| JP | 2008-038090 A | 2/2008 |
| JP | 2009-028990 A | 2/2009 |
| JP | 2009-285926 A | 12/2009 |
| JP | 2010-510357 A | 4/2010 |
| JP | 2011-057916 A | 3/2011 |
| JP | 2011-063771 A | 3/2011 |
| JP | 2011-063772 A | 3/2011 |
| JP | 2011-162620 A | 8/2011 |
| JP | 2011-195684 A | 10/2011 |
| JP | 2012-136572 A | 7/2012 |
| JP | 2012-136589 A | 7/2012 |
| JP | 2013-053175 A | 3/2013 |
| JP | 2013-155280 A | 8/2013 |
| JP | 2013-184998 A | 9/2013 |
| JP | 2013-203960 A | 10/2013 |
| JP | 2013-224340 A | 10/2013 |
| JP | 2014-184695 A | 10/2014 |
| JP | 2014-240491 A | 12/2014 |
| JP | 2015-025076 A | 2/2015 |
| JP | 2016-193980 A | 11/2016 |
| JP | 2018-109119 A | 7/2018 |
| JP | 2018-123293 A | 8/2018 |
| JP | 2018168268 A * | 11/2018 |
| JP | 2019-536825 A | 12/2019 |
| JP | 2020-007444 A | 1/2020 |
| JP | 6658668 B2 * | 3/2020 |
| JP | 2020-200372 A | 12/2020 |

OTHER PUBLICATIONS https://si.vwr.com/store/product/23383636/silica-gel-nanoparticles-40-w-w-colloidal-dispersion-in-water-ludox-as-40-sigma-aldrich (Year: 2025).*

Extended European Search Report for Application No. EP 19 18 4730 dated Nov. 20, 2019 (5 pages).

Lubrizol Corporation, "Surfactants," Cleveland, OH, Oct. 2019, URL: https://lubrizolcdmo.com/wp-content/uploads/2019/10/TB-11-Surfactants_lowres.pdf, pp. 1-5.

* cited by examiner

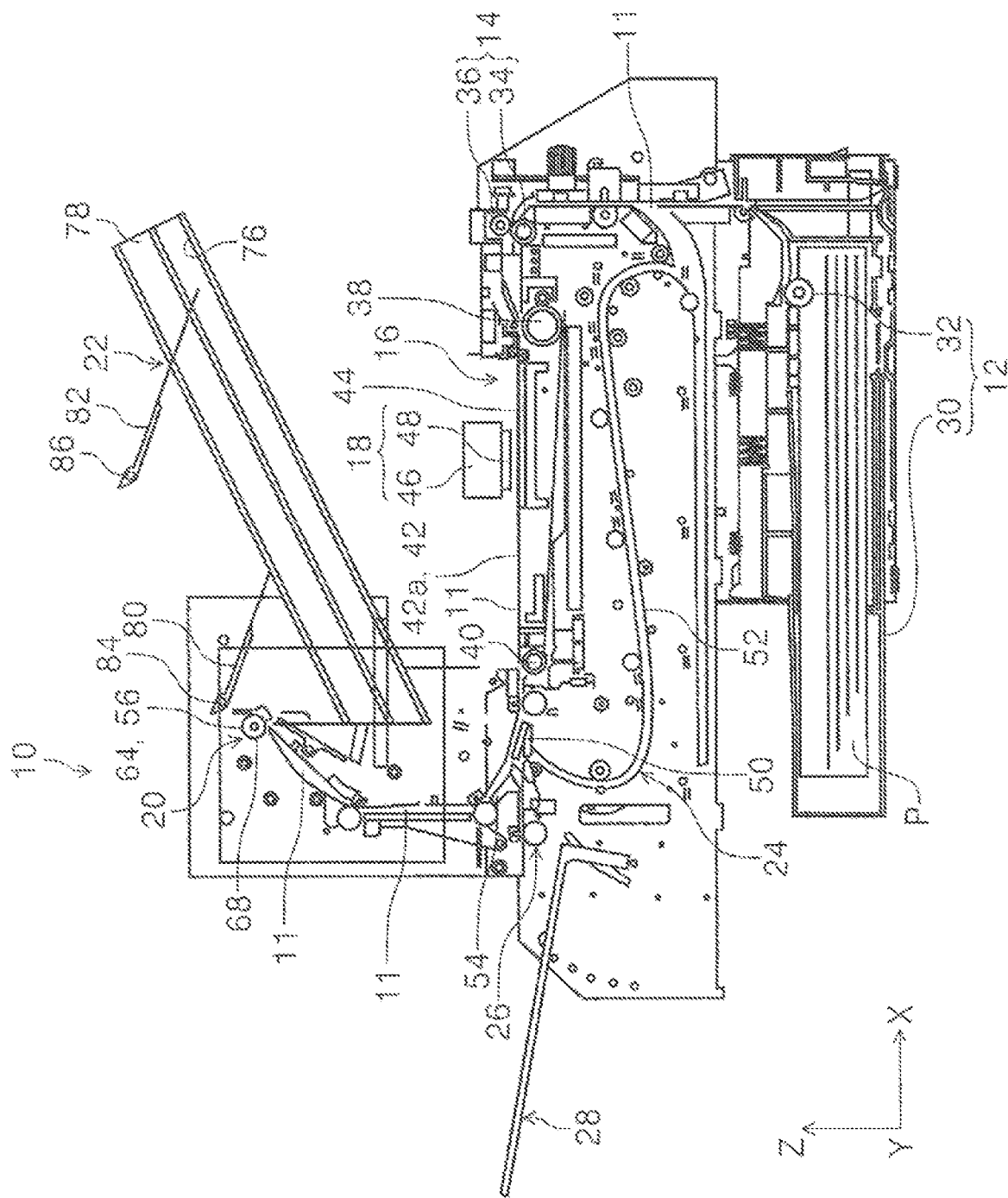

INK JET INK COMPOSITION AND RECORDING METHOD

The present application is based on, and claims priority from JP Application Serial Number 2021-048962, filed Mar. 23, 2021, the disclosure of which is hereby incorporated by reference herein in its entirety.

BACKGROUND

1. Technical Field

The present disclosure relates to an ink jet ink composition and a recording method.

2. Related Art

An ink jet recording method is able to record a highly fine image by a relatively simple apparatus, and developments thereof have been rapidly carried out in various fields. Among the above developments, improvement in printing density and stacking property has been studied by incorporating, for example, inorganic particles other than pigments into an ink composition. For example, JP-A-2008-031356 has disclosed, in order to improve the printing density and the like, an ink composition containing a self-dispersible pigment and metal oxide particles having a predetermined particle size, and JP-A-2020-007444 has disclosed, in order to improve the stacking property, an ink composition containing a pigment, a colloidal silica, and an amino acid.

Although the printing density and the stacking property are improved by using a colloidal silica or the like as disclosed in JP-A-2008-031356 and JP-A-2020-007444, when a content of the colloidal silica is large, a problem in that nozzle clogging is liable to occur may arise when the ink is dried in the vicinity of an ink jet head nozzle. In order to suppress the drying as described above, although a moisturizing agent is considered to be contained in an ink composition, a moisturizing agent having a high moisture retaining power may be a solid or a high-viscous liquid at room temperature in many cases, and furthermore, an increase in viscosity of the ink composition may disadvantageously occur.

SUMMARY

According to an aspect of the present disclosure, there is provided an ink jet ink composition comprising: a colorant; silica particles; 1-(2-hydroxyethyl)-2-pyrrolidone; and water, and the silica particles described above have in a TEM image thereof, a Di (diameter of the maximum inscribed circle)/Dc (diameter of the minimum circumscribed circle) of 0.7 or more.

In addition, according to another aspect of the present disclosure, there is provided a recording method comprising: an ejection step of ejecting the ink jet ink composition described above to a recording medium.

BRIEF DESCRIPTION OF THE DRAWINGS

FIG. 1 is a schematic cross-sectional view showing a recording apparatus according to this embodiment.

DESCRIPTION OF EXEMPLARY EMBODIMENTS

Hereinafter, if needed, with reference to the drawing, although an embodiment (hereinafter, referred to as "this embodiment") of the present disclosure will be described in detail, the present disclosure is not limited thereto and may be variously changed and/or modified without departing from the scope of the present disclosure. In addition, in the drawing, the same element is designated by the same reference numeral, and duplicated description will be omitted. In addition, a positional relationship, such as up and down and left and right, is based on the positional relationship shown in the drawing unless otherwise particularly noted. Furthermore, a dimensional ratio of the drawing is not limited to that shown in the drawing.

1. Ink Jet Ink Composition

An ink jet ink composition (hereinafter, simply referred to as "ink composition" in some cases) of this embodiment includes a colorant; silica particles; 1-(2-hydroxyethyl)-2-pyrrolidone; and water, and the silica particles described above have in a TEM image thereof, a Di (diameter of the maximum inscribed circle)/Dc (diameter of the minimum circumscribed circle) of 0.7 or more.

Heretofore, although the improvement in printing density and stacking property has been studied using a colloidal silica or the like, the ink composition as described above has a problem in that nozzle clogging is liable to occur during drying.

On the other hand, in this embodiment, since 1-(2-hydroxyethyl)-2-pyrrolidone which is excellent in moisture retaining property and dissolving ability and which is able to suppress clogging of an ink composition containing a silica is used together with silica particles having a shape which is not likely to increase the viscosity, while advantages of the silica particles, such as curling suppression and improvement in color development property, are obtained, an ink composition which has an excellent clogging resistance and which is able to suppress an increase in viscosity can be provided. Hereinafter, individual components of the ink composition will be described in detail.

1.1. Colorant

As the colorant, for example, a pigment or a dye may be mentioned. Among those mentioned above, the pigment is preferably used.

Although the pigment is not particularly limited, for example, there may be used an azo pigment (such as an azo lake pigment, an insoluble azo pigment, a condensed azo pigment, or a chelate azo pigment); a polycyclic pigment (such as a phthalocyanine pigment, a perylene pigment, a perinone pigment, an anthraquinone pigment, a quinacridone pigment, a dioxazine pigment, a thioindigo pigment, an isoindolinone pigment, or a quinophthalone pigment); an organic pigment, such as a nitro pigment, a nitroso pigment, or an aniline black; a carbon black (such as a furnace black, a thermal lamp black, an acetylene black, or a channel black); an inorganic pigment, such as a metal oxide, a metal sulfide, or a metal chloride; or an extender pigment, such as calcium carbonate or talc.

Although the dye is not particularly limited, for example, an acidic dye, a basic dye, a direct dye, a reactive dye, or a dispersive dye may be mentioned.

A content of the colorant with respect to a total mass of the ink composition is 1.0 to 12.5 percent by mass, preferably 2.5 to 10 percent by mass, and more preferably 5.0 to 8.0 percent by mass.

1.2. Silica Particles

When the silica particles are used, the curling can be suppressed, and the color development property can be improved. In view of curling suppression, in general, although a moisture content in the ink composition is considered to be decreased, when the moisture content in the ink composition is decreased, the viscosity thereof is increased, and as a result, an ejection stability is disadvantageously degraded. In this case, when the silica particles are used, even if the moisture content in the ink composition is decreased, the viscosity can be suppressed from being increased. The reason for this is believed due to an improvement in lubricity by repulsion of electrified silica particles and the shapes thereof. In addition, since the silica particles are contained, a filling effect is obtained on paper, and the permeation of moisture in a recording medium is suppressed. As a result, the curling can be suppressed, and in addition, the color development property can also be improved.

The suppression of viscosity increase by the lubricity of the silica particles and the curling suppression by the filling effect thereof as described above have been understood to be dependent on the shapes of the silica particles. Accordingly, as the silica particles used in this embodiment, a colloidal silica in which silica particles are dispersed using a solvent forming the ink as a dispersion medium is preferable. In the TEM image of the silica particles, the Di (diameter of the maximum inscribed circle)/Dc (diameter of the minimum circumscribed circle) is 0.7 or more, preferably 0.8 to 1.0, and more preferably 0.9 to 1.0. Since the Di (diameter of the maximum inscribed circle)/Dc (diameter of the minimum circumscribed circle) is 0.7 or more, the silica particles form no clusters, and the shapes of the silica particles are close to true spheres. Accordingly, even when a large amount of the silica particles is used in order to suppress the curling and to improve the color development property, the viscosity of the ink composition is not likely to be increased, and the ejection stability is further improved.

By using a TEM image of a dispersion liquid of silica particles taken by a transmission electron microscope, the Di (diameter of the maximum inscribed circle)/Dc (diameter of the minimum circumscribed circle) is calculated from the average values of the diameters (Di) of the maximum inscribed circles and the diameters (Dc) of the minimum circumscribed circles of 20 silica particles. In addition, the maximum inscribed circle and the minimum circumscribed circle are defined such that when an outline of each silica particle is sandwiched with two circles, and the difference in diameter between an outer circle and an inner circle is minimized, the outer circle and the inner circle are defined as the minimum circumscribed circle and the maximum inscribed circle, respectively.

The average particle diameter of the silica particles is preferably 10 to 80 nm, more preferably 15 to 65 nm, and further preferably 20 to 50 nm. When the average particle diameter of the silica particles is in the range described above, the clogging and the viscosity increase tend to be further suppressed.

A content of the silica particles with respect to the total mass of the ink composition is preferably 1.0 to 15 percent by mass, preferably 2.0 to 12.5 percent by mass, and further preferably 4.0 to 10 percent by mass. Since the content of the silica particles is 1.0 percent by mass or more, the curling suppression and the color development property tend to be further improved. In addition, since the content of the silica particles is 15 percent by mass or less, the clogging and the viscosity increase tend to be further suppressed.

A content of the silica particles with respect to 100 parts by mass of 1-(2-hydroxyethyl)-2-pyrrolidone is preferably 50 to 500 parts by mass, more preferably 100 to 400 parts by mass, and further preferably 150 to 300 parts by mass. Since the content of the silica particles with respect to 1-(2-hydroxyethyl)-2-pyrrolidone is 50 parts by mass or more, the curling suppression and the color development property tend to be further improved. In addition, since the content of the silica particles with respect to 1-(2-hydroxyethyl)-2-pyrrolidone is 500 parts by mass or less, the clogging and the viscosity increase tend to be further suppressed.

1.3. 1-(2-Hydroxyethyl)-2-Pyrrolidone

Since 1-(2-hydroxyethyl)-2-pyrrolidone is used, the moisture retaining property and the dissolving ability are improved, and the clogging of an ink composition containing silica particles can be suppressed. On the other hand, although having a relatively high viscosity and being liable to cause the viscosity increase of the ink composition, when 1-(2-hydroxyethyl)-2-pyrrolidone is used together with the above silica particles having a predetermined shape, the viscosity increase as described above can be made not likely to occur. Hence, when 1-(2-hydroxyethyl)-2-pyrrolidone and the silica particles having a predetermined shape are used in combination, even if the silica particles are contained in order to suppress the curling and to improve the color development property, the clogging is not likely to be generated, and in addition, the viscosity increase is also suppressed. As a result, an ink composition also excellent in ejection stability can be obtained.

A content of 1-(2-hydroxyethyl)-2-pyrrolidone with respect to the total mass of the ink composition is preferably 0.5 to 10 percent by mass, more preferably 0.5 to 7.5 percent by mass, and further preferably 1.0 to 5.0 percent by mass. Since the content of 1-(2-hydroxyethyl)-2-pyrrolidone described above is 0.5 percent by mass or more, the moisture retaining property is obtained, and the clogging tends to be more unlikely to be generated. In addition, since the content of 1-(2-hydroxyethyl)-2-pyrrolidone described above is 10 percent by mass or less, the viscosity increase of the ink composition tends to be further suppressed.

1.4. Water

A content of the water with respect to the total mass of the ink composition is preferably 45 to 70 percent by mass, more preferably 50 to 65 percent by mass, and further preferably 55 to 65 percent by mass. Since the content of the water described above is 70 percent by mass or less, the curling of a recorded matter to be obtained tends to be suppressed. In addition, since the content of the water described above is 45 percent by mass or more, the clogging and the viscosity increase tend to be further suppressed.

1.5. Other Components

The ink composition of this embodiment may further contain, if needed, a betaine, an alkali, a water-soluble organic solvent, a surfactant, and/or other additives.

1.5.1. Betaine

The betaine is a compound having a positive charge and a negative charge not adjacent thereto in the same molecule and no charge as the entire molecule. The positive charge portion is preferably a quaternary ammonium cation. Although the betaine as described above is not particularly limited, for example, there may be mentioned trimethylglycine, γ-butyrobetaine, homarine, trigonelline, carnitine, homoserine betaine, valine betaine, lysine betaine, ornithine betaine, alanine betaine, stachydrine, or glutamate betaine. Among those mentioned above, trimethylglycine, γ-butyrobetaine, or carnitine is preferable, and trimethylglycine is more preferable. When the betaine as described above is used, the clogging tends to be further suppressed. In addition, the betaine may be used alone, or at least two types thereof may be used in combination.

A content of the betaine with respect to the total mass of the ink composition is preferably 2.0 to 16 percent by mass, more preferably 4.0 to 14 percent by mass, and further preferably 6.0 to 12 percent by mass. Since the content of the betaine is in the range described above, when the silica particles are aggregated by drying, hard aggregates are suppressed from being formed, and in addition, a dispersion stability of the silica particles is improved, so that the clogging tends to be further suppressed.

The content of the betaine is preferably larger than a content of a solid component of the silica particles on a mass basis. In particular, the content of the betaine with respect to the content of the solid component of the silica particles on a mass basis is preferably 1.05 to 5.0 times, more preferably 1.1 to 4.0 times, and further preferably 1.1 to 3.0 times. Since the content of the betaine is in the range described above, the clogging tends to be further suppressed.

1.5.2. Alkali

Although the alkali is not particularly limited, for example, there may be mentioned an organic base, such as triethanolamine, diethanolamine, monoethanolamine, or tripropanolamine; or an inorganic base, such as lithium hydroxide, sodium hydroxide, or potassium hydroxide.

Among those mentioned above, the organic base is preferable. Since the organic base has an acidity constant (pKa) at ordinary temperature in a range of 7 to 10 unlike the inorganic base such as sodium hydroxide, extraction of a proton reversibly occurs in the ink, and the organic base is able to function as a buffer agent to improve the stability of the silica particles.

A content of the alkali with respect to the total mass of the ink composition is preferably 0.05 to 1.5 percent by mass, more preferably 0.10 to 1.0 percent by mass, and further preferably 0.20 to 0.75 percent by mass. Since the content of the alkali is in the range described above, the dispersion stability of the silica particles is further improved, and hence, the clogging tends to be further suppressed.

1.5.3. Water-Soluble Organic Solvent

The ink jet ink of this embodiment may also contain, beside the above 1-(2-hydroxyethyl)-2-pyrrolidone, a water-soluble organic solvent (hereinafter, referred to as "another water-soluble organic solvent).

Although the another water-soluble organic solvent is not particularly limited, for example, there may be mentioned glycerin; a nitrogen-containing solvent, such as 2-pyrrolidone or N-methyl pyrrolidone; a glycol, such as ethylene glycol, diethylene glycol, triethylene glycol, propylene glycol, dipropylene glycol, tripropylene glycol, propanediol, butanediol, pentanediol, or hexylene glycol; or a glycol monoalkyl ether, such as ethylene glycol monomethyl ether, diethylene glycol monomethyl ether, diethylene glycol monoethyl ether, diethylene glycol monobutyl ether, or triethylene glycol monobutyl ether.

A content of the another water-soluble organic solvent with respect to the total mass of the ink composition is preferably 3.0 to 25 percent by mass, more preferably 5.0 to 20 percent by mass, and further preferably 7.5 to 15 percent by mass.

1.5.4. Surfactant

Although the surfactant is not particularly limited, for example, an acetylene glycol-based surfactant, a fluorine-based surfactant, or a silicone-based surfactant may be mentioned. Among those mentioned above, the acetylene glycol-based surfactant is preferable.

Although the acetylene glycol-based surfactant is not particularly limited, for example, at least one selected from the group consisting of 2,4,7,9-tetramethyl-5-decyne-4,7-diol, an alkylene oxide adduct thereof, 2,4-dimethyl-5-decyne-4-ol, and an alkylene oxide adduct thereof is preferable.

Although the fluorine-based surfactant is not particularly limited, for example, there may be mentioned a perfluoroalkyl sulfonate, a perfluoroalkyl carboxylate, a perfluoro phosphate, a perfluoroalkyl ethylene oxide adduct, a perfluoroalkyl betaine, or a perfluoroalkyl amine oxide compound.

As the silicone-based surfactant, for example, a polysiloxane-based compound or a polyether-modified organosiloxane may be mentioned.

A content of the surfactant with respect to the total mass of the ink composition is preferably 0.3 to 2.0 percent by mass, more preferably 0.5 to 1.5 percent by mass, and further preferably 0.75 to 1.25 percent by mass.

1.6. Viscosity

The viscosity of the ink composition at 20° C. is preferably 7.0 mPa·s or less, more preferably 1.0 to 7.0 mPa·s, and further preferably 1.0 to 5.0 mPa·s. Since the viscosity described above is in the range described above, the ejection stability tends to be further improved.

2. Recording Method

A recording method of this embodiment includes an ejection step of ejecting the ink composition described above to a recording medium by an ink jet method, and if needed, may also include a drying step or the like.

2.1. Ejection Step

In the ejection step, the ink is ejected from an ink jet head and is adhered to the recording medium. In more particular, by driving a pressure generating device provided in the ink jet head, the ink filled in the pressure generating device of the ink jet head is ejected from a nozzle. The ejection method as described above is also called an ink jet method.

As the ink jet head used in the ejection step, a line head to perform recording by a line method or a serial head to perform recording by a serial method may be mentioned.

In the line method using a line head, for example, an ink jet head having a width equivalent to or larger than a recording width of a recording medium is fixed to a recording apparatus. In addition, the recording medium is transported along a sub-scanning direction (transport direction of the recording medium), and in conjunction with this transportation, an ink droplet is ejected from a nozzle of the ink jet head, so that an image is recorded on the recording medium.

In the serial method using a serial head, for example, an ink jet head is mounted on a carriage configured to be transferred in a width direction of a recording medium. In addition, the carriage is transferred along a main scanning direction (width direction of the recording medium), and in conjunction with this transfer, an ink droplet is ejected from a nozzle of the head, so that an image is recorded on the recording medium.

2.2. Recording Medium

Although a recording medium used in this embodiment is not particularly limited, for example, an absorbing or a non-absorbing recording medium may be mentioned. Among those media mentioned above, since an absorbing recording medium is liable to cause a curling problem, the present disclosure is advantageous.

Although the absorbing recording medium is not particularly limited, for example, there may be mentioned regular paper, such as electrophotographic paper, having a high ink permeability; ink jet paper (ink jet exclusive paper having an ink absorbing layer formed from silica particles or aluminum particles or having an ink absorbing layer formed from a hydrophilic polymer, such as a poly(vinyl alcohol) (PVA) or a poly(vinyl pyrrolidone) (PVP)); or art paper, coated paper, or cast paper, which has a relatively low ink permeability and which is used for general offset printing.

Among those mentioned above, the recording medium is preferably regular paper. Since the regular paper is liable to cause a curling problem, the present disclosure is advantageous.

In this case, the "absorbing recording medium" indicates a "recording medium having a water absorbing amount of more than 10 mL/m$^2$ for 30 msec from a contact start measured by Bristow method". This Bristow method is a most popular measurement method of a liquid absorption amount in a short time and has also been employed by Japan Technical Association of the Pulp and Paper Industry (JAPAN TAPPI). The details of the test method has been disclosed in Standard No. 51 "Paper and Paperboard-Liquid Absorption Test Method-Bristow Method", JAPAN TAPPI PAPER AND PULP TEST METHODS, 2000.

3. Recording Apparatus

A recording apparatus of this embodiment includes an ink jet head having at least one nozzle to eject an ink jet ink to a recording medium and a transport device to transport the recording medium. The ink jet head includes a pressure chamber to which the ink is supplied and the nozzle to eject the ink. In addition, the transport device is formed from a transport roller and/or a transport belt provided in the recording apparatus.

Hereinafter, the recording apparatus according to this embodiment will be described with reference to FIGURE. In addition, in the X-Y-Z coordinate system shown in FIGURE, an X direction indicates a length direction of the recording medium, a Y direction indicates a width direction of the recording medium in a transport path in the recording apparatus, and a Z direction indicates a height direction of the apparatus.

As one example of a recording apparatus 10, a line type ink jet printer capable of performing printing at a high rate and at a high density will be described. The recording apparatus 10 includes a feed portion 12 to store a recording medium P such as paper, a transport portion 14, a belt transport portion 16, a record portion 18, an Fd (facedown) discharge portion 20 functioning as a "discharge portion", an Fd (facedown) stage 22 functioning as a "stage", a reverse path portion 24 functioning as a "reverse transport mechanism", an Fu (faceup) discharge portion 26, and an Fu (faceup) stage 28.

The feed portion 12 is disposed at a lower side of the recording apparatus 10. The feed portion 12 includes a feed tray 30 to store the recording medium P and a feed roller 32 to feed the recording medium P stored in the feed tray 30 to a transport path 11.

The recording medium P stored in the feed tray 30 is fed to the transport portion 14 along the transport path 11 by the feed roller 32. The transport portion 14 includes a transport drive roller 34 and a transport driven roller 36. The transport drive roller 34 is rotationally driven by a driving source not shown. In the transport portion 14, the recording medium P is nipped between the transport drive roller 34 and the transport driven roller 36 and is then transported to the belt transport portion 16 located downstream of the transport path 11.

The belt transport portion 16 includes a first roller 38 located upstream of the transport path 11, a second roller 40 located downstream thereof, an endless belt 42 fitted to the first roller 38 and the second roller 40 in a rotationally transferable manner, and a support body 44 to support an upper-side section 42a of the endless belt 42 between the first roller 38 and the second roller 40.

The endless belt 42 is driven by the first roller 38 driven by the driving source not shown or the second roller 40 so as to be transferred from a +X direction to a −X direction in the upper-side section 42a. Hence, the recording medium P transported from the transport portion 14 is further transported downstream of the transport path 11 in the belt transport portion 16.

The record portion 18 includes a line type ink jet head 48 and a head holder 46 to hold the ink jet head 48. In addition, the record portion 18 may also be a serial type in which an ink jet head is mounted on a carriage which is reciprocally transferred in a Y axis direction. The ink jet head 48 is disposed so as to face the upper-side section 42a of the endless belt 42 supported by the support body 44. When the recording medium P is transported in the upper-side section 42a of the endless belt 42, the ink jet head 48 ejects the ink to the recording medium P, so that the recording is carried out. While the recording is carried out, the recording medium P is transported downstream of the transport path 11 by the belt transport portion 16.

In addition, the line type ink jet head is a head used for the recording apparatus in which a nozzle region formed in a direction intersecting the transport direction of the recording medium P is provided so as to cover the entire recording medium P in the intersecting direction, and while one of the head and the recording medium P is fixed, the other is transferred to form an image. In addition, the nozzle region of the line head in the intersecting direction may not cover the entire recording medium P in the intersecting direction in the recording apparatus.

In addition, at downstream of the transport path 11 of the belt transport portion 16, a first branch portion 50 is provided. The first branch portion 50 is configured to switchably communicate with one of the transport path 11 to transport the recording medium P to the Fd discharge portion 20 or the Fu discharge portion 26 and the reverse path 52 of the reverse path portion 24 in which after a recording surface of the recording medium P is reversed, the recording medium P is again transported to the record portion 18. In addition, the recording medium P to be transported after the transport path 11 is switched to the reverse path 52 by the first branch portion 50 is processed such that the recording surface thereof is reversed in a transport process in the reverse path 52 and is again transported to the record portion 18 so that a surface of the recording medium P opposite to the original recording surface faces the ink jet head 48.

At downstream of the first branch portion 50 along the transport path 11, a second branch portion 54 is further provided. The second branch portion 54 is configured so as to transport the recording medium P to one of the Fd discharge portion 20 and the Fu discharge portion 26 by switching the transport direction of the recording medium P.

The recording medium P transported to the Fd discharge portion 20 by the second branch portion 54 is discharged from the Fd discharge portion 20 and then placed on the Fd stage 22. In this case, the recording surface of the recording medium P is placed so as to face the Fd stage 22. In addition, the recording medium P transported to the Fu discharge portion 26 by the second branch portion 54 is discharged from the Fu discharge portion 26 and then placed on the Fu stage 28. In this case, the recording surface of the recording medium P is placed so as to face a side opposite to the Fu stage 28.

In the recording apparatus using an ink jet method, since an ink in the form of liquid is adhered to a recording medium, a recording medium, in particular, an absorbing recording medium, such as regular paper or an ink jet paper, may cause a curling problem or the like. On the other hand, in this embodiment, since the silica particles are used, the curling is suppressed, and in addition, the color development property of a recorded matter to be obtained can be improved.

In addition, the case in which the line type ink jet head is used has been described above by way of example, the recording apparatus of this embodiment may be a printer (serial printer) using a serial type ink jet head. In the serial printer, while a recording medium is transported in a transport direction, the ink jet head is transferred in a direction intersecting the transport direction described above, so that the recording is performed.

EXAMPLES

Hereinafter, the present disclosure will be described in more detail with reference to Examples and Comparative Examples. However, the present disclosure is not limited to the following Examples.

1. Preparation of Ink

After individual components were charged in a mixture tank to have one of the compositions shown in Table 1 and then mixed and stirred, filtration was further performed using a 5-membrane filter, so that an ink jet ink composition of each Example was obtained. In addition, the numerical value of each component of each Example shown in the table indicates percent by mass unless otherwise particularly noted. In addition, in the table, the numerical value of the pigment indicates percent by mass of a solid content.

[Silica Particles]
  Colloidal Silica A (ST-CM, particle size: 22 nm, solid content: 30%, spherical shape, manufactured by Nissan Chemical Corporation)
  Colloidal Silica B (ST-OL, particle size: 45 nm, solid content: 20%, spherical shape, manufactured by Nissan Chemical Corporation)
  Colloidal Silica C (ST-OUP, primary particle size: 12 nm, solid content: 15%, chain shape, manufactured by Nissan Chemical Corporation)
  Colloidal Silica D (PL-3, particle size: 34 nm, solid content: 19.5%, non-spherical shape, manufactured by Fuso Chemical Co., Ltd.)
[Surfactant]
  Olfine E1010 (trade name, acetylene glycol-based surfactant, manufactured by Air Products and Chemicals, Inc.)
  Surfynol 104 (trade name, acetylene glycol-based surfactant, manufactured by Nisshin Chemical Industry Co., Ltd.)
[Water-Soluble Organic Solvent]
  1-(2-hydroxyethyl)-2-pyrrolidone
  2-pyrrolidone
  TEGmBE (triethylene glycol monobutyl ether)
  Glycerin
[Betaine]
  Trimethylglycine (betaine anhydride, manufactured by Tokyo Chemical Industry Co., Ltd.)
[Alkali]
  Triethanolamine (manufactured by Tokyo Chemical Industry Co., Ltd.)

TABLE 1

| | | EXAMPLE | | | | COMPARATIVE EXAMPLE | | | |
|---|---|---|---|---|---|---|---|---|---|
| | | 1 | 2 | 3 | 4 | 1 | 2 | 3 | 4 |
| SILICA PARTICLES | COLLOIDAL SILICA A | — | 4.0 | 7.0 | — | — | — | — | — |
| | COLLOIDAL SILICA B | 7.0 | — | — | 10.0 | — | — | — | — |
| | COLLOIDAL SILICA C | — | — | — | — | — | — | — | 7.0 |
| | COLLOIDAL SILICA D | — | — | — | — | — | 7.0 | 4.0 | — |
| PIGMENT | Aqua-Black | 7.0 | 7.0 | 7.0 | 7.0 | 7.0 | 7.0 | 7.0 | 7.0 |
| SURFACTANT | OLFINE E1010 | 0.5 | 0.5 | 0.5 | 0.5 | 0.5 | 0.5 | 0.5 | 0.5 |
| | SURFYNOL 104 | 0.5 | 0.5 | 0.5 | 0.5 | 0.5 | 0.5 | 0.5 | 0.5 |
| WATER-SOLUBLE ORGANIC SOLVENT | 1-(2-HYDROXYETHYL)-2-PYRROLIDONE | 3.0 | 2.0 | 3.0 | 4.0 | 3.0 | 3.0 | — | — |
| | 2-PYRROLIDONE | — | — | — | — | — | — | — | 3.0 |
| | TEGmBE | 2.0 | 2.0 | 2.0 | 2.0 | 2.0 | 2.0 | 2.0 | 2.0 |
| | GLYCERIN | 10.0 | 12.0 | 10.0 | 7.0 | 17.0 | 10.0 | 12.0 | 10.0 |
| BETAINE | TRIMETHYLGLYCINE | 8.0 | 10.0 | 8.0 | 7.0 | 8.0 | 8.0 | 8.0 | 8.0 |
| ALKALI | TRIETHANOLAMINE | 0.5 | 0.5 | 0.5 | 0.5 | 0.5 | 0.5 | 0.5 | 0.5 |
| WATER | | BALANCE | BALANCE | BALANCE | BALANCE | BALANCE | BALANCE | BALANCE | BALANCE |
| Di | | 44 | 21 | 21 | 44 | — | 18 | 12 | 12 |
| Dc | | 46 | 26 | 26 | 46 | — | 61 | 73 | 73 |
| Di/Dc | | 0.96 | 0.81 | 0.81 | 0.96 | — | 0.30 | 0.16 | 0.16 |
| PRESENCE OF SILICA PARTICLE CLUSTERS | | NO | NO | NO | NO | — | YES | YES | YES |
| EVALUATION | CURLING | A | B | A | A | C | B | B | B |
| | COLOR DEVELOPMENT PROPERTY | A | B | B | A | C | B | B | A |
| | CLOGGING | A | A | B | B | A | B | C | C |
| | VISCOSITY | A | A | A | B | B | C | B | C |

Abbreviations and product components used in Table 1 are as shown below.
[Pigment]
  Aqua-Black: self-dispersible carbon black "Aqua-Black 162" (trade name, manufactured by Tokai Carbon Co., Ltd.)

1.1. Measurement Method of Di and Dc

A TEM image of a dispersion liquid of the silica particles of each Example was obtained using a Tecnai G2 F30 (manufactured by FEI), and from the TEM image, 20 silica particles were selected. When the outline of each silica particle thus selected was sandwiched with 2 circles, and when the difference in diameter between an outer circle and an inner circle was minimized, the outer circle and the inner circle were regarded as the minimum circumscribed circle and the maximum inscribed circle, respectively. From the average value of the diameter (Di) of the maximum inscribed circle and the average value of the diameter (Dc) of the minimum circumscribed circle obtained from the 20 silica particles, Di/Dc was calculated.

2. Evaluation Method 2.1. Curling Evaluation

The ink prepared as described above was filled in a Printer PX-S840 manufactured by Seiko Epson Corporation, and sentences using Microsoft Word (font size: 11, style: standard, MS PGothic) at a rate of 700 characters/page were printed on an A4-size recording medium (Xerox P paper, copy paper, basis weight: 64 g/m$^2$, paper thickness: 88 μm, manufactured by Fuji Xerox Co., Ltd.) in an environment at a temperature of 25° C. and a humidity of 50%. Subsequently, the paper thus treated was placed on a floor surface in a facedown state, and an angle formed between an edge of the paper and a point at which the paper and the floor surface were in contact with each other was measured, so that the curling was evaluated.

[Evaluation Criteria]

A: maximum curling angle of less than 90°
B: maximum curling angle of 90° to less than 100°
C: maximum curling angle of 100° or more 2.2. Color Development Property The ink was filled in a Printer PX-S840 manufactured by Seiko Epson Corporation, and a solid pattern was printed at a printing duty of 100% and with an ink adhesion amount of 4.5 mg/inch$^2$ on an A4-size recording medium (Xerox P paper, copy paper, basis weight: 64 g/m$^2$, paper thickness: 88 μm, manufactured by Fuji Xerox Co., Ltd.) in an environment at a temperature of 25° C. and a humidity of 50%. Subsequently, an OD value of the image was measured using a colorimeter (Xrite manufactured by Xrite), and the color development property was evaluated in accordance with the following evaluation criteria.

[Evaluation Criteria]

A: OD value of 1.3 or more
B: OD value of 1.2 to less than 1.3
C: OD value of less than 1.2

2.3. Viscosity

The viscosity of the ink composition thus obtained was measured under a condition of a 200 shear rate using a rheometer (MCR300, manufactured by Anton Paar) in an environment at a temperature of 20° C. and a humidity of 50%.

[Evaluation Criteria]

A: viscosity of 5.0 mPa·s or less
B: viscosity of more than 5.0 to less than 7.0 mPa·s
C: viscosity of 7.0 mPa·s or more 2.4. Clogging Resistance The ink was filled in a Printer PX-S840 manufactured by Seiko Epson Corporation, and a test chart published by The Imaging Society of Japan at an image coverage of 5% was printed continuously on 5,000 sheets of A4-size recording media (Xerox P paper, copy paper, basis weight: 64 g/m$^2$, paper thickness: 88 μm, manufactured by Fuji Xerox Co., Ltd.) in an environment at a temperature of 40° C. and a humidity of 20%. Subsequently, whether or not white stripes caused by nozzle curving and/or nozzle missing were present was confirmed, and based on the number of the white stripes thus confirmed, the clogging resistance was evaluated in accordance with the following criteria.

[Evaluation Criteria]

A: number of white stripes is less than 3.
B: number of white stripes is 3 to less than 10.
C: number of white stripes is 10 or more.

3. Evaluation Result

In Table 1, the composition and the evaluation result of the ink of each Example are shown. From Table 1, it was found that when the silica particles having a predetermined shape and 1-(2-hydroxyethyl)-2-pyrrolidone were used in combination, the curling of the recorded matter thus obtained could be suppressed, the color development property thereof was improved, and in addition, the clogging and the viscosity increase could be suppressed.

What is claimed is:

1. An ink jet ink composition comprising:
a colorant;
silica particles;
1-(2-hydroxyethyl)-2-pyrrolidone;
a betaine; and
water,
wherein the silica particles have in a TEM image thereof, a Di (diameter of the maximum inscribed circle)/Dc (diameter of the minimum circumscribed circle) of 0.7 or more, and
wherein the silica particles have an average particle diameter of 45 to 80 nm.

2. The ink jet ink composition according to claim 1, wherein the silica particles are a colloidal silica.

3. The ink jet ink composition according to claim 1, wherein the silica particles have an average particle diameter of 10 to 80 nm.

4. The ink jet ink composition according to claim 1, wherein a content of the silica particles with respect to a total mass of the ink jet ink composition is 1.0 to 15 percent by mass.

5. The ink jet ink composition according to claim 1, wherein a content of the water with respect to a total mass of the ink jet ink composition is 50 to 65 percent by mass.

6. The ink jet ink composition according to claim 1, wherein a content of the 1-(2-hydroxyethyl)-2-pyrrolidone with respect to a total mass of the ink jet ink composition is 0.5 to 10 percent by mass.

7. The ink jet ink composition according to claim 1, wherein a content of the silica particles with respect to 100 parts by mass of 1-(2-hydroxyethyl)-2-pyrrolidone is 50 to 500 parts by mass.

8. The ink jet ink composition according to claim 1, wherein the ink jet ink composition has a viscosity of 7.0 mPa·s or less at 20° C.

9. A recording method comprising:
an ejection step of ejecting the ink jet ink composition according to claim 1 to a recording medium.

10. The recording method according to claim 9, wherein the recording medium is regular paper.

* * * * *